United States Patent
Terrazas et al.

(10) Patent No.: US 6,592,659 B1
(45) Date of Patent: Jul. 15, 2003

(54) COMPOSITIONS FOR AQUEOUS DELIVERY OF FLUORINATED SILANES

(75) Inventors: Michael S. Terrazas, Prescott, WI (US); Mark J. Pellerite, Woodbury, MN (US); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/002,543

(22) Filed: Nov. 15, 2001

(51) Int. Cl.$^7$ ............................................. C09D 18/308
(52) U.S. Cl. ....................... 106/287.13; 106/287.14; 106/287.27; 428/447; 428/421; 427/387
(58) Field of Search ................. 106/287.13, 287.14, 106/287.27; 427/387; 428/421, 447

(56) References Cited

U.S. PATENT DOCUMENTS

| | | | |
|---|---|---|---|
| 3,012,006 A | 12/1961 | Holbrook et al. | |
| 3,450,738 A | 6/1969 | Blochl | |
| 3,646,085 A | 2/1972 | Bartlett | |
| 3,772,195 A | 11/1973 | Francen | |
| 3,787,351 A | 1/1974 | Olson | |
| 3,810,874 A | 5/1974 | Mitsch et al. | |
| 3,950,588 A | 4/1976 | McDougal | |
| 4,090,967 A | 5/1978 | Faulk | |
| 4,099,574 A | 7/1978 | Cooper et al. | |
| 4,242,516 A | 12/1980 | Mueller | |
| 4,359,096 A | 11/1982 | Berger | |
| 4,383,929 A | 5/1983 | Bertocchio et al. | |
| 4,472,286 A | 9/1984 | Falk | |
| 4,536,298 A | 8/1985 | Kamei et al. | |
| 4,648,904 A | 3/1987 | DePasquale et al. | |
| 4,668,406 A | 5/1987 | Chang | |
| 4,795,764 A | 1/1989 | Alm et al. | |
| 4,983,769 A | 1/1991 | Bertocchio et al. | |
| 5,085,786 A | 2/1992 | Alm et al. | |
| 5,226,954 A | 7/1993 | Suzuki | |
| 5,274,159 A | * 12/1993 | Pellerite et al. | ............. 556/485 |
| 5,442,011 A | 8/1995 | Halling | |
| 5,547,711 A | * 8/1996 | Kirchmeyer et al. | ........ 427/386 |
| 5,550,184 A | 8/1996 | Halling | |
| 5,602,225 A | 2/1997 | Montagna et al. | |
| 5,702,509 A | 12/1997 | Pellerite et al. | |
| 5,851,674 A | 12/1998 | Pellerite et al. | |
| 5,980,992 A | 11/1999 | Kistner et al. | |
| 6,204,350 B1 | 3/2001 | Liu et al. | |
| 6,221,434 B1 | 4/2001 | Visca et al. | |
| 6,277,485 B1 | 8/2001 | Invie et al. | |
| 2001/0002042 A1 | 5/2001 | Avery | |

FOREIGN PATENT DOCUMENTS

| | | |
|---|---|---|
| EP | 0 611 771 A1 | 8/1994 |
| EP | 0738771 A1 | 10/1996 |
| JP | 5-78682 * | 3/1993 |
| WO | WO 95/23804 | 9/1995 |
| WO | WO 97/23432 | 7/1997 |
| WO | WO 98/40439 | 9/1998 |
| WO | WO 99/29636 | 6/1999 |
| WO | WO 01/18135 A1 | 3/2001 |
| WO | WO 01/30873 A1 | 5/2001 |
| WO | WO 01/90267 A2 | 11/2001 |

OTHER PUBLICATIONS

English language translation of JP 5078682 Mar. 1993.*
Erik Kissa, "Fluorinated Surfactants and Repellents," pp. 1–21 (Marcel Dekker, Inc., ed., 2d ed. 2001).
Milton J. Rosen, "Surfactants and Interfacial Phenomena," pp. 1, 3–4 (John Wiley & Sons, ed., 2d ed. 1989). Phenomena, Milton J. Rosen, Characteristic Features of Surfactants, pp. 1–4.

* cited by examiner

*Primary Examiner*—Margaret G. Moore
(74) *Attorney, Agent, or Firm*—Lisa M. Fagan

(57) ABSTRACT

The invention relates to a dilutable, non-aqueous concentrate and an aqueous dilution used for aqueous delivery of fluorinated silanes to a substrate, a method of treating a substrate with the aqueous dilution composition to render it oil and water repellent, and articles having coatings made from the aqueous dilution.

32 Claims, No Drawings

COMPOSITIONS FOR AQUEOUS DELIVERY OF FLUORINATED SILANES

FIELD OF THE INVENTION

This invention relates to aqueous delivery of fluorinated silanes to a substrate. More particularly, the present invention is a dilutable, non-aqueous concentrate comprising at least one fluorinated silane and at least one fluorinated surfactant, which together with water or an aqueous solvent mixture form an aqueous dilution that may be coated and cured on a substrate.

BACKGROUND OF THE INVENTION

Good oil-repellent and water-repellent coatings may be provided to certain substrates by applying to a substrate fluorinated silanes in the molten state or dissolved in volatile organic solvents. The applied fluorinated silanes are cured by heating with a catalyst to chemically affix the fluorinated silanes to the substrates. (See, for example, U.S. Pat. No. 3,012,006 (Holbrook et al.)). However, the use of volatile organic solvents is generally harmful to the environment, and may be hazardous due to the flammability of the solvents. Therefore, an alternative means to apply fluorinated silanes to substrates was developed, which is to use aqueous delivery. (See, for examples, U.S. Pat. No. 5,274,159 (Pellerite et al.), U.S. Pat. No. 5,702,509 (Pellerite et al.), and U.S. Pat. No. 5,550,184 (Halling)).

One problem with known compositions for the aqueous delivery of fluorinated silanes to substrates is that they may not have long shelf lives. Another problem is that they may require high-shear mixing before they are coated on a substrate. Known compositions have high solids content, which result in thick coatings Although using aqueous delivery of fluorinated silanes to substrates is known in the art, there continues to be a desire to provide compositions for aqueous delivery of fluorinated silanes that: 1) can be stored for relatively long periods of time; 2) do not require high-shear mixing or other input of mechanical energy; 3) have relatively low solids content, making them easier to coat thinly on glass and other substrates; and 4) at the same time, once applied to a substrate and cured, can provide durable coatings.

SUMMARY OF THE INVENTION

The present invention provides compositions for the aqueous delivery of fluorinated silanes. One type of composition is a dilutable, non-aqueous concentrate and another type is an aqueous dilution comprising the dilutable, non-aqueous concentrate and a diluting medium that comprises water or an aqueous solvent mixture.

The dilutable, non-aqueous concentrate comprises a non-aqueous, homogeneous mixture comprising: (a) at least one fluorinated silane of the formula I:

wherein $R_f^1$ represents a monofunctional or difunctional fluorinated group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and (b) at least one fluorinated surfactant. The dilutable, non-aqueous concentrate may optionally further comprise one or both of at least one organic cosolvent and at least one additive.

The dilutable, non-aqueous concentrate must be diluted with water or an aqueous solvent mixture before being coated on a substrate. Advantageously, the dilutable, non-aqueous concentrate has a relatively long shelf life that is greater than about 1 day, preferably greater than about 14 days, and most preferably greater than about 6 months under proper storage conditions. The dilutable, non-aqueous concentrate may be shipped and stored more economically than in diluted form. The dilutable, non-aqueous concentrate may be diluted at the location where it is to be coated, which advantageously allows for greater flexibility in choices of the dilution and hence thickness of the coatings being applied. The dilutable, non-aqueous concentrate is dispersed in water or an aqueous solvent mixture (to form the aqueous dilution) simply by shaking by hand a mixture of the dilutable, non-aqueous concentrate and either water or an aqueous solvent mixture. No additional mechanical processing, such as high-shear mixing or ultrasonication, is required.

The aqueous dilution comprises: (a) a diluting medium comprising water or an aqueous solvent mixture comprising water and at least one water miscible cosolvent; and (b) a dilutable, non-aqueous concentrate comprising a non-aqueous, homogeneous mixture comprising: (i) at least one fluorinated silane of the formula I:

wherein $R_f^1$ represents a monofunctional or difunctional fluorinated group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and (ii) at least one fluorinated surfactant.

The aqueous dilution may be coated on a substrate to provide a durable coating. Advantageously, the aqueous dilution of the present invention has a relatively low solids content, which makes it easier to coat thinly on glass or other siliceous substrates that may have, for example, optical properties that are sensitive to thickness. The inventive aqueous dilution allows for the elimination of or the substantial reduction in the use of organic solvents in the process that may be flammable and/or harmful to the environment. The aqueous dilution also has a shelf life that is at least several hours under proper storage conditions.

Other embodiments of the present invention include a method of treating a substrate, and an article comprising a substrate and a coating that is formed by coating and curing the aqueous dilution.

DETAILED DESCRIPTION OF THE INVENTION

Dilutable, Non-aqueous Concentrate

The dilutable, non-aqueous concentrate of the present invention comprises a non-aqueous, homogeneous mixture that comprises at least one fluorinated silane and at least one fluorinated surfactant. The dilutable, non-aqueous concentrate may optionally further comprise at least one organic cosolvent, and/or at least one additive.

A "homogeneous mixture," when referring to the dilutable, non-aqueous concentrate, is defined as the dilutable, non-aqueous concentrate being stable, i.e., no substantial precipitation or substantial phase separation occurs for at least the time necessary to prepare an aqueous dilution from the dilutable, non-aqueous concentrate, however, preferably, and for the purpose of being commercially practical, the dilutable concentrate is stable for a period of at least about one hour, and preferably up to about six months or longer, under proper storage conditions (closed container, no water, room temperature). The dilutable, non-aqueous concentrate may be clear or somewhat hazy.

By the term "non-aqueous" it is meant that water is not added as a component of the dilutable, non-aqueous concentrate. However, there may be adventitious water in the other components of the composition, but the total amount of water does not adversely affect the shelf life or the stability of the dilutable, non-aqueous concentrate (i.e., preferably less than about 0.1 wt % of the dilutable, non-aqueous concentrate).

Fluorinated Silane

The fluorinated silane of the dilutable, non-aqueous concentrate has the formula

 (I)

wherein $R_f^1$ represents a monofunctional or difunctional fluorinated group, optionally containing one or more ether oxygen atoms, Q independently represents an organic difunctional or trifunctional linking group, $R^1$ independently represents a $C_1$–$C_4$ alkyl group, Y independently represents a hydrolyzable group, x is 0 or 1, y is 1 or 2, and z is 1 or 2. Fluorinated silanes of Formula I are incompatible with water (meaning, the fluorinated silanes cannot substantially combine with water to form a single phase blend) and immiscible with water (meaning, the fluorinated silanes cannot substantially combine with water so as to result in the combination or blend exhibiting a single $T_g$ or $T_m$).

The monofunctional or difunctional fluorinated group $R_f^1$ includes linear, branched, and/or cyclic structures, that may be saturated or unsaturated. It is preferably a: perfluorinated group (i.e., all C—H bonds are replaced by C—F bonds). However, hydrogen or chlorine may be present as substituents instead of fluorine provided that not more than one atom of either is present for every two carbon atoms, and, preferably, if hydrogen and/or chlorine is present, the $R_f^1$ group terminates in at least one perfluoromethyl group.

In one embodiment, $R_f^1$ includes mono- and/or difunctional perfluoropolyethers comprising perfluorinated repeating units selected from the group consisting of —($C_nF_{2n}$)—, —($C_nF_{2n}$O)—, —(CF(Z))—, (CF(Z)O)—, —(CF(Z)$C_nF_{2n}$O)—, —($C_nF_{2n}$CF(Z)O)—, and combinations thereof. In these repeating units, Z is a fluorine atom, a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of perfluoropolyethers containing polymeric moieties made of these repeating units are disclosed in U.S. Pat. No. 6,277,485 (Invie et al.) (which is incorporated herein by reference). For the monofunctional perfluoropolyether group, the terminal groups can be ($C_nF_{2n+1}$)—, ($C_nF_{2n+1}$O)— or (X'$C_nF_{2n}$O)—, wherein X' is H, Cl, or Br, for example. Preferably, these terminal groups are perfluorinated. In these repeating units or terminal groups, n is 1 to 6, and preferably 1 to 3.

Preferred approximate average structures for a difunctional perfluoropolyether group include —$CF_2O(CF_2O)_m(C_2F_4O)_pCF_2$—; —$CF(CF_3)(OCF_2CF(CF_3))_mO(C_nF_{2n})O(CF(CF_3)CF_2O)_pCF(CF_3)$—, n ranges from 2 to 4; —$CF_2O(C_2F_4O)_pCF_2$; and —$(CF_2)_3O(C_4F_8O)_p(CF_2)_3$—; wherein average values for m and p range from 0 to 50, with the proviso that m and p are not simultaneously zero. Of these, particularly preferred approximate average structures are —$CF_2O(CF_2O)_m(C_2F_4O)_pCF_2$—, —$CF_2O(C_2F_4O)_pCF_2$—, and —$CF(CF_3)(OCF_2CF(CF_3))_mO(C_nF_{2n})O(CF(CF_3)CF_2O)_pCF(CF_3)$—, wherein n ranges from 2 to 4 and the average value of m+p is from about 4 to about 20.

Particularly preferred approximate average structures for a monofunctional perfluoropolyether group include $C_3F_7O(CF(CF_3)CF_2O)_pCF(CF_3)$— and $CF_3O(C_2F_4O)_pCF_3$— wherein an average value for p is 4 to 50. As synthesized, these compounds typically include a distribution of oligomers and/or polymers, so p and m may be non-integral. The approximate average structure is the approximate average over this distribution.

These distributions may also contain perfluorinated chains having no functional groups (inert fluids) or more than two terminal groups (branched structures) as a consequence of the methods used in their synthesis. Typically, distributions containing less than about 10% by weight of nonfunctionalized compounds (e.g., those without silane groups) can be used.

Throughout, when referring to the distributions (m, n, and p), the words "average value of p," for example, may be used interchangeably with the words "average value for p," "number average p," and the symbols "$P_{avg}$" and "$P_{av}$." The different ways of referring to the distribution mean the same thing, as described above.

In another embodiment $R_f^1$ includes mono- and difunctional perfluoroalkyl and perfluoroalkylene groups of the respective formulas $C_nF_{2n+1}$— and —$C_nF_{2n}$—, where n is 3 to 20, preferably 4 to 10. Such groups may be linear or branched, or a mixture thereof.

Suitable linking groups, Q, include difunctional or trifunctional organic linking groups optionally containing heteroatoms (such as sulfur, oxygen, nitrogen, and the like, for examples) and/or functional groups (such as amides, esters, sulfonamides, carbonates, and the like, for examples).

Examples of Q groups include, but are not limited to, difunctional groups: —C(O)NH($C_kH_{2k}$)—, —$SO_2$NR($C_kH_{2k}$)—, —($C_kH_{2k}$)—, —$CH_2O(C_kH_{2k}$)—, —C(O)S($C_kH_{2k}$)—, and —$CH_2OC(O)N(R)(C_kH_{2k})$—, wherein R is hydrogen or a $C_1$–$C_4$ alkyl group, and wherein k is 2 to 25; and the trifunctional group:

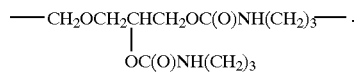

Preferred linking groups (Q) are —C(O)NH($CH_2)_3$—, —$CH_2O(CH_2)_3$—, and —$CH_2OC(O)N(R)(CH_2)_3$—, when $R_f^1$ is a perfluoropolyether. Other preferred linking groups (Q) are —$SO_2NR(C_kH_{2k})$—, —$C_kH_{2k}$— where k is greater than or equal to 2, and —$CH_2O(CH_2)_3$—, when $R_f^1$ is a perfluoroalkyl or perfluoroalkylene.

Y independently represents a hydrolyzable group in Formula I. Specific preferred examples of hydrolyzable groups include methoxy groups, ethoxy groups, $C_3$–$C_6$ alkoxy groups optionally containing one ether oxygen, and mixtures thereof. If there is more than one type of Y in the fluorinated silane, each Y is a hydrolyzable group, but they need not be the same hydrolyzable group.

$R^1$ independently represents a $C_1$–$C_4$ alkyl group. Examples of alkyl groups that are preferred include methyl and ethyl groups.

Fluorinated silanes of Formula I generally have a molecular weight (number average) of at least about 300 grams per mole, and preferably, at least about 500 grams per mole, and most preferably between at least about 1000 grams per mole and 3000 grams per mole.

With respect to Formula I, a preferred group of fluorinated silanes includes those where:

$R_f^1$ is:

(a) —CF(CF$_3$)(OCF$_2$CF(CF$_3$))$_m$O(C$_n$F$_{2n}$)O(CF(CF$_3$)CF$_2$O)$_p$CF(CF$_3$)—, wherein average values of m and p are from 1 to 20, m+p$\leq$20, more preferably m+p=about 4 to about 12, and n ranges from 1 to 4; or (b) —CF$_2$O(CF$_2$O)$_m$(CF$_2$CF$_2$O)$_p$CF$_2$—, and the average value of m+p=16 to 24;

(c) C$_3$F$_7$O(CF(CF$_3$)CF$_2$O)$_p$CF(CF$_3$)—, wherein the average value of p=4 to 15;

(d) CF$_3$O(CF$_2$CF$_2$O)$_p$CF$_2$—, wherein the average value of p=5 to 20; or (e) CF$_3$CF$_2$CF$_2$O(CF$_2$CF$_2$CF$_2$O)$_n$—, wherein $n_{avg}$=1 to 20.

Q is independently an organic difunctional or trifunctional linking group, optionally containing a heteroatom or a functional group;

$R^1$ is independently a $C_1$–$C_4$ alkyl group;

Y is independently selected from the group consisting of methoxy groups, ethoxy groups, $C_3$–$C_6$ alkoxy groups optionally containing one ether oxygen, and mixtures thereof;

x is 0 or 1;

y is 1 or 2; and z is 1 or 2.

When $R_f^1$ is a perfluoroalkyl or perfluoroalkylene group, $R_f^1$ may include linear, branched, or cyclic structures, that may be saturated or unsaturated. $R_f^1$ may be represented by the formulae —C$_{k'}$F$_{2k'+1}$ for a perfluoroalkyl group, or by —C$_{k'}$F$_{2k'}$— for a perfluoroalkylene group, wherein k' is about 3 to about 20, more preferably, about 6 to about 12, and most preferably, about 7 to about 10. With reference to Formula I, the difunctional or trifunctional Q group may comprise linear, branched, or cyclic structures, that may be saturated or unsaturated.

Typically, suitable fluorinated silanes include a mixture of isomers (e.g., a mixture of compounds containing linear and branched perfluoroalkyl groups). Mixtures of fluorinated silanes exhibiting different values of k' can also be used.

Examples of preferred fluorinated perfluoroalkylsilanes include, but are not limited to, the following: C$_7$F$_{15}$CH$_2$OCH$_2$CH$_2$CH$_2$Si(OCH$_3$)$_3$; C$_7$F$_{15}$CH$_2$OCH$_2$CH$_2$CH$_2$Si(CH$_3$)(OCH$_3$)$_2$; C$_7$F$_{15}$CH$_2$OCH$_2$CH$_2$CH$_2$Si(OC$_2$H$_5$)$_3$; C$_8$F$_{17}$SO$_2$N(Et)CH$_2$CH$_2$CH$_2$Si(OCH$_3$)$_3$; C$_4$F$_9$SO$_2$N(Me)CH$_2$CH$_2$CH$_2$Si(OCH$_3$)$_3$; C$_8$F$_{17}$CH$_2$CH$_2$Si(OCH$_3$)$_3$; C$_3$F$_7$CH$_2$OCH$_2$CH$_2$CH$_2$Si(OCH$_3$)$_3$)$_3$; C$_6$F$_{13}$CH$_2$CH$_2$Si(OCH$_2$CH$_3$)$_3$; and C$_8$F$_{17}$CH$_2$CH$_2$Si(OCH$_2$CH$_3$)$_3$. Mixtures of these fluorinated perfluoroalkyl silanes may be used if desired.

The fluorinated silanes of Formula I can be synthesized using standard techniques. For example, commercially available or readily synthesized perfluoropolyether esters can be combined with a functionalized silane, such as a 3-aminopropyltrisilane, according to methods taught in U.S. Pat. No. 3,810, 874 (Mitsch et al.) and U.S. Pat. No. 3,646,085 (Bartlett), which are incorporated herein by reference. These materials may or may not need to be purified before use in the dilutable, non-aqueous concentrate.

The fluorinated silane is generally included in the dilutable, non-aqueous concentrate composition in an amount between about 10 wt % and about 80 wt % of the dilutable, non-aqueous concentrate, preferably between about 20 wt % and about 75 wt %, and most preferably between about 25 wt % and about 50 wt %.

Fluorinated Surfactant

A surfactant is defined as "a substance that, when present at low concentration in a system, has the property of adsorbing onto the surfaces or interfaces of the system and of altering to a marked degree the surface or interfacial free energies of these surfaces." (Milton J. Rosen, "Surfactants and Interfacial Phenomena," Second Ed., John Wiley & Sons, New York, NY, 1989, page 1). These surfactants have "a characteristic molecular structure consisting of a structural group that has very little attraction for [a] solvent, known as a lyophobic group, together with a group that has a strong attraction for [a] solvent, called the lyophilic group . . . ." (Milton J. Rosen, "Surfactants and Interfacial Phenomena," Second Ed., John Wiley & Sons, New York, N.Y., 1989, pages 3–4). When the solvent is aqueous, the lyophobic group is typically a nonpolar group such as alkyl or fluorinated alkyl, while the lyophilic group is a polar group.

The term "fluorinated" (as in the term fluorinated surfactant) indicates that at least about 75 percent, preferably at least about 85 percent, more preferably at least about 95 percent, of the hydrogen atoms of the alkyl moiety are replaced by fluorine atoms. Optionally, remaining hydrogen atoms can be replaced by other halogen atoms, such as by chlorine atoms.

The fluorinated surfactant acts to stabilize an emulsion (that is, droplets of one liquid phase dispersed in another liquid phase), and can aid in solubility or compatibility of the fluorinated silane(s) and the organic cosolvent(s) (if there is one or more organic cosolvent(s)) of the dilutable, non-aqueous concentrate.

Fluorinated surfactants useful in this invention are amphiphilic materials, comprising one or more hydrophobic fluorochemical segments and one or more solubilizing and hydrophilic segments. Such materials are described in "Fluorinated Surfactants and Repellents", Second Edition, by E. Kissa, Surfactant Science Series, Volume 97, Marcel Dekker, Inc.: New York, 2001, pp 1–21. The fluorinated surfactants have a fluorine content by weight of at least 10%. These fluorinated surfactants can be monomeric or polymeric, with molecular weights between about 300 and about 100,000 grams per mole, preferably between about 400 and about 20,000 grams per mole. The hydrophobic fluorochemical groups can be, for instance, perfluoroalkyl containing between about 3 and about 20 carbon atoms, or a mono- or divalent perfluoropolyether group with molecular weight between about 300 and about 10,000 grams per mole. Hydrophilic groups on the fluorinated surfactants can be of anionic (such as carboxylate), cationic (such as quaternary ammonium), nonionic (such as oligo(oxyethylene)) or amphoteric (such as amine oxide) nature as long as they do not contain functionalities that cause instability in the concentrates of this invention, for example strongly acidic groups, strongly basic groups, or contamination by fluoride ions.

Representative fluorinated surfactants include, but are not limited to, the following:

C$_7$F$_{15}$CO$_2^-$NH$_4^+$

C$_8$F$_{17}$SO$_2$N(C$_2$H$_5$)(C$_2$H$_4$O)$_7$CH$_3$

C$_8$F$_{17}$(C$_2$H$_4$O)$_{10}$H (C$_4$F$_9$SO$_2$)$_2$N$^{31}$ NH$_4^+$

C$_4$F$_9$SO$_2$N(CH$_3$)(C$_2$H$_4$O)$_n$CH$_3$ (where $n_{avg}$~7)

C$_3$F$_7$O(CF(CF$_3$)CF$_2$O)$_n$CF(CF$_3$)CO$_2^-$NH$_4^+$ (where $n_{avg}$~13)

Examples of these and other fluorinated surfactants of the present invention are described, for example, in U.S. Pat. No. 3,772,195 (Francen), U.S. Pat. No. 4,090,967 (Falk), U.S. Pat. No. 4,099,574 (Cooper et al.), U.S. Pat. No. 4,242,516 (Mueller), U.S. Pat. No. 4,359,096 (Berger), U.S. Pat. No. 4,383,929 (Bertocchio et al.), U.S. Pat. No. 4,472,286 (Falk), U.S. Pat. No. 4,536,298 (Kamei et al.), U.S. Pat. No. 4,795,764 (Alm et al.), U.S. Pat. No. 4,983,769 (Bertocchio et al.) and U.S. Pat. No. 5,085,786 (Alm et al.), which are herein incorporated by reference. Many of these fluorinated surfactants are commercially available from Minnesota Mining and Manufacturing Company (St. Paul, Minn.), having the tradename FLUORAD™, or commercially available from E.I. DuPont de Nemours and Co. (Wilmington, Del.), having the tradename ZONYL™.

Polymeric fluorinated surfactants can also be used in the present invention. Examples of polymeric fluorinated surfactants that may be used in the present invention are found in U.S. Pat. No. 3,787,351 (Olson), U.S. Pat. No. 4,668,406 (Chang), and PCT Int'l App. WO 01/30873, which are incorporated herein by reference.

Examples of polymeric fluorinated surfactants that may be used include random copolymer fluorinated surfactants. Examples of random copolymer fluorinated surfactants include the following structures:

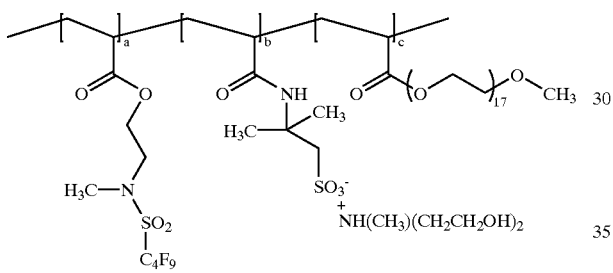

wherein the molar ratio of a:b:c is about 30: about 1 : about 32, and wherein the molecular weight of the surfactant is about 1,000 to about 4,000 grams per mole; and

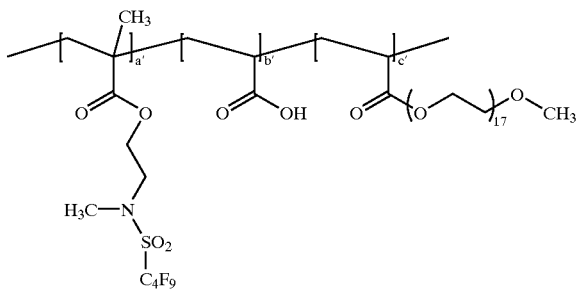

wherein the molar ratio of a':b':c' is about 3: about 3: about 1, and wherein the molecular weight of the surfactant is about 5,000 to about 40,000 grams per mole.

The fluorinated surfactant is generally included in the dilutable, non-aqueous concentrate in an amount up to about 50 wt % of the dilutable, non-aqueous concentrate, preferably up to about 30 wt %, and most preferably up to about 15 wt %.

Optional Organic Cosolvent

A dilutable, non-aqueous concentrate of the present invention may also optionally include one or more organic cosolvents. An organic cosolvent is an organic liquid component that renders the surfactant(s) and the fluorinated silane(s) compatible (in case they are not compatible in the absence of the organic cosolvent), and lowers the viscosity of the dilutable, non-aqueous concentrate.

Suitable organic cosolvents are organic solvents, or mixtures of organic solvents, that include, but are not limited to, aliphatic alcohols, such as methanol, ethanol, and isopropyl alcohol; ketones, such as acetone or methyl ethyl ketone; esters, such as ethyl acetate or methyl formate; ethers, such as diisopropyl ether, 1,4-dioxane, and diethylene glycol dimethyl ether; and amides, such as N-methylpyrrolidinone, and N, N-dimethylformamide. Fluorinated organic solvents, such as heptafluorobutanol, trifluoroethanol and hexafluoroisopropanol, may be used alone or in combination with non-fluorinated organic cosolvents.

Preferred organic cosolvents are aliphatic alcohols. Some examples of preferred aliphatic alcohols are ethanol, methanol and isopropyl alcohol. Other examples include DOW-ANOL™ PnP (available from Sigma-Aldrich, Milwaukee, Wis.), and DOWANOL™ PM (available from Sigma-Aldrich), etc.

Preferably, the organic cosolvent is water miscible. Also, preferably, the organic cosolvent has a boiling point that is below 200° C.

The organic cosolvent may generally be included, if used, in the dilutable, non-aqueous concentrate in an amount up to about 75 wt % of the dilutable, non-aqueous concentrate, and preferably up to about 50 wt %.

Optional Additives

The dilutable, non-aqueous concentrate may also include one or more optional additives.

Some examples of optional additives are catalysts to assist with curing and/or crosslinking of the dilutable, non-aqueous concentrate once it is diluted and coated on a substrate. A curing additive may be added when necessary to facilitate the cure. Such a curing additive may take the form of an acid precursor, which releases an acid upon exposure to heat, ultraviolet light, visible light, electron beam irradiation, or microwave irradiation. Acid precursors include, for instance, sulfonium and iodonium salts as well as alkyl esters of alkane- or fluoroalkanesulfonic acids, and are described in U.S. Pat. No. 6,204,350 (Liu et al.) incorporated by reference.

Some additives, such as ammonium salts of acids such as perfluorocarboxylic acids, alkylsulfonic acids, arylsulfonic acids, perfluoroalkylsulfonic acids, and perfluoroalkylsulfonimides can function as latent or thermally activated curing additives as well as function as surfactants. Therefore, the dilutable, non-aqueous concentrate may include one of these dual-functioning surfactants, and may not need a separate catalyst.

Other possible optional additives include, but are not limited to, hydrocarbon surfactants, silicone surfactants, antimicrobial agents, UV absorbers, hydrocarbon silanes, and micro- or nanoparticles of inorganic materials, such as silica or titania.

An optional additive or additives may be included in the dilutable, non-aqueous concentrate in an amount up to about 50% by weight of the dilutable, non-aqueous concentrate, more preferably up to about 5% by weight.

The dilutable, non-aqueous concentrate may be prepared by combining the components in any order and in a fashion that is known in the art. Preferably, for the embodiment comprising at least one fluorinated silane, at least one fluorinated surfactant and at least one organic cosolvent, the surfactant(s) and organic cosolvent(s) are first mixed and then the fluorinated silane(s) is added to the mixture.

If the dilutable, non-aqueous concentrate is not immediately homogeneous after mixing the ingredients, the concentrate may become homogeneous after time has passed. In order to speed homogeneity, however, the dilutable, non-aqueous concentrate may be heated.

For ease of manufacture etc., the dilutable, non-aqueous concentrate is typically diluted with a diluting medium (or the aqueous dilution composition is typically prepared) shortly before use.

The presence of certain chemical functionalities such as strong acids (i.e., sulfonic, mineral, phosphoric, and perfluorinated acids) and species such as fluoride ion are preferably avoided in the dilutable, non-aqueous concentrate of this invention if they lead to instability of the corresponding aqueous dilution and/or the dilutable, non-aqueous concentrate itself.

Aqueous Dilution

Another embodiment of the present invention is an aqueous dilution, which comprises: the dilutable, non-aqueous concentrate, described above; and, a diluting medium that comprises water or an aqueous solvent mixture comprising water and a water miscible cosolvent. The aqueous dilution may also include optional additives.

Diluting Medium

The diluting medium of the aqueous dilution comprises water or an aqueous solvent mixture. The aqueous solvent mixture comprises water and a water miscible cosolvent.

Examples of water miscible cosolvents include, but are not limited to, methanol, ethanol, isopropyl alcohol, acetone, diethylene glycol dimethyl ether, DOWANOL™ PM, and N-methylpyrrolidinone.

The amount of water miscible cosolvent that is included in the aqueous dilution (if an aqueous solvent mixture is used) is dependent upon the coating technique that is to be used to coat the aqueous dilution, as well as dependent upon the performance characteristics that are desired in the resultant coated substrate.

Optional Additives

The aqueous dilution may also optionally comprise at least one additive. Some exemplary additives are described above. The optional additive(s) of the aqueous dilution may be in addition to the additive(s) in the dilutable, non-aqueous concentrate. As discussed above with regard to the dilutable, non-aqueous concentrates, additives which adversely affect the stability of the aqueous dilution are preferably avoided. These additives may include strongly acidic species and fluoride ions. The pH of the aqueous dilution is in the range of about 2 to about 11, and most preferably about 4 to about 8.

The aqueous dilution may be prepared by first combining the components of the dilutable, non-aqueous concentrate and then subsequently adding the dilutable, non-aqueous concentrate to the diluting medium. The aqueous dilution is preferably prepared, however, by adding the diluting medium to the dilutable, non-aqueous concentrate.

The amount of dilutable, non-aqueous concentrate that is typically in the aqueous dilution is from about 0.05 wt % to about 10 wt % of the aqueous dilution, preferably from about 0.1 wt % to about 2 wt %. The aqueous dilution may be a clear solution as well as a somewhat hazy solution.

An optional additive or additives may be added to the aqueous dilution after the dilutable, non-aqueous concentrate has been diluted. One preferred optional additive is a curing additive, such as those discussed above, that may be added to the aqueous dilution in an amount up to about 3 wt % of the aqueous dilution.

The aqueous dilution is generally applied to a substrate (substrate described in detail below with regard to the method) in an amount sufficient to produce a coating that is water and oil repellent. This coating can be extremely thin, e.g., about 1 to about 2 nanometers in thickness, though in practice a coating may be thicker, e.g., up to about 50 nanometers in thickness.

Alternatively, a substrate may be first treated with the aqueous dilution, and then treated with acid to promote curing of the silane. The acid may be applied neat, but is preferably applied as a solution in water or in an organic solvent.

The aqueous dilution of the present invention advantageously spreads well on a substrate to achieve uniform properties over the whole surface of the treated substrate. In addition, the aqueous dilutions minimize or eliminate the use of volatile organic compounds (VOCs), thereby reducing pollution and exposure to potentially harmful, and often flammable, solvent vapors.

Method

The present invention also provides a method for treating a substrate, comprising the steps of applying the aqueous dilution of the invention, as discussed above, to a substrate and curing the aqueous dilution to form a treated substrate.

Suitable substrates that can be treated with the aqueous dilution of this invention include, but are not limited to, substrates having a hard surface preferably with functional groups, such as —OH groups that occur on siliceous substrates, capable of reacting with the silane. Preferably, such reactivity of the surface of the substrate is provided by functional groups having active hydrogen atoms, such as —OH. When such active hydrogen atoms are not present, the substrate may first be treated in a plasma containing oxygen or in a corona atmosphere to make it reactive to the fluorinated silane.

Treatment of substrates renders the treated surfaces less retentive for soils and more readily cleanable due to the oil and water repellent nature of the treated surfaces. These desirable properties are maintained despite extended exposure or use and repeated cleanings because of the high degree of durability of the treated surface.

Preferably, the substrate is cleaned prior to applying the aqueous dilution of the present invention so as to obtain optimum characteristics, particularly durability. That is, the surface of the substrate to be coated preferably is substantially free of organic contamination prior to coating. Cleaning techniques depend on the type of substrate and include, for example, a solvent washing step with an organic solvent, such as acetone or ethanol, or exposure to a reactive gas-phase treatment such as air plasma or UV/ozone.

Useful substrates include, but are not limited to, textiles, apparel, leather, paper, cardboard, carpet, ceramics, glazed ceramics, porcelain, flat glass, hollow glass, metals (such as aluminum, iron, stainless steel, copper and the like), metal oxides, natural and man-made stone, thermoplastic materials (such as poly(meth)acrylate, polycarbonate, vinyl, polystyrene, styrene copolymers such as styrene/acrylonitrile copolymers, and polyesters such as polyethylene terephthalate), paints (such as those based on acrylic resins), powder coatings (such as polyurethane, epoxy or hybrid powder coatings), and wood.

Preferred substrates include metals and siliceous substrates including ceramics, glazed ceramics, glass, concrete, mortar, grout and natural and man-made stone. Particularly preferred substrates include glazed ceramics and glass. Various articles, having at least one substrate, can be effectively treated with the inventive aqueous dilution to provide a water and oil repellent coating thereon. Examples include glazed ceramic tiles, enameled bathtubs or toilets, glass shower panels, construction glass, various parts of a vehicle (such as the mirror or windscreen), and glazed ceramic or enamel pottery materials.

Another particularly preferred substrate is a substrate having an antireflective (AR) film on it. Antireflective (AR) films prepared by vacuum sputtering of metal oxide thin films on substrates made of glass or plastic are particularly useful in display devices of electronic equipment. Such metal oxide films are relatively porous and consist of clusters of particles forming a relatively rough profile. AR films help reduce glare and reflection. When the AR films are conductive, they also help reduce static discharge and electromagnetic emissions. Thus, a primary application for AR films is to provide contrast enhancement and antireflective properties to improve the readability of display devices, such as computer monitors. AR films are described in U.S. Pat. No. 5,851,674 (Pellerite et al.), which is incorporated herein by reference.

Sputtered metal oxide antireflective films are generally durable and uniform. Also, their optical properties are controllable, which makes them very desirable. They also have very high surface energies and refractive indices. However, the high surface energy of a sputtered metal oxide surface makes it prone to contamination by organic impurities (such as skin oils). The presence of surface contaminants results in a major degradation of antireflectivity properties of the metal oxide coatings. Furthermore, because of the high refractive indices, surface contamination becomes noticeable to the end-user. The present inventive method allows for a protective coating on an antireflective film that is relatively durable, and more resistant to contamination and easier to clean than the antireflective film by itself.

Preferably, the overall coating thickness of the dried coating ("dried down coating") of the aqueous dilution on an antireflective article is greater than a monolayer (which is typically greater than about 1.5 nanometers (nm) thick). That is, preferably, a coating from the aqueous dilution is at least about 2.0 nm thick for antisoiling purposes on articles having an AR film, and more preferably, at least about 3.0 nm thick. Preferably, it is less than about 10.0 nm thick, and more preferably, less than about 5.0 nm thick. The coating from the aqueous dilution is typically present in an amount that does not substantially change the antireflective characteristics of the antireflective article.

Methods for applying the aqueous dilution to a substrate include, but are not i limited to, spray, spin, dip, flow, and roll coat methods, etc. A preferred coating method: for application of the aqueous dilution includes spray application. Spraying may be effected by passing the pressurized aqueous dilution though a suitable jet, nozzle or orifice onto the substrate surface in the form of a stream or atomized mist.

A substrate to be coated can typically be contacted with the aqueous dilution at room temperature (typically about 20° C. to about 25° C.). Alternatively, the aqueous dilution can be applied to a substrate that is preheated at a temperature of, for example, between 60° C. and 150° C. This is of particular interest for industrial production, where e.g., ceramic tiles can be treated immediately after the firing oven at the end of the production line. Following application, the treated substrate can be dried and cured at ambient or elevated temperature for a time sufficient to dry or cure.

The obtained coating on the substrate may be cured by UV radiation or thermally. For UV cure, curing additives may be added (such as those optional additives described above). Thermal curing is performed at an elevated temperature of about 40 to about 300° C., although elevated temperatures may not be required. The heat for curing can be supplied either through an initial preheat of substrates having sufficient heat capacity to provide the heat for curing, or through heating of coated substrates by an external heat source subsequent to coating.

Article

Another embodiment of the present invention is an article comprising: (a) a substrate (as described above); and, (b) a coating on said substrate obtained by applying the aqueous dilution (described above) onto said substrate and curing said aqueous dilution.

EXAMPLES

The invention is further illustrated by the following Examples, but the particular materials and amounts thereof recited in these Examples, as well as other conditions and details, should not be construed to unduly limit this invention.

TABLE 1

Table of Materials.

| Material | Structure (and/or chemical name) | Availability |
| --- | --- | --- |
| Ammonium hydroxide | $NH_4OH$; ~28% wt in water | Sigma-Aldrich, Milwaukee, WI |
| DBI $NH_4$ | $C_4F_9SO_2$ \ N$^-$ $^+NH_4$ / $C_4F_9SO_2$ | Copending Patent Application having Ser. No. 09/853,065; Ex. 2 & 3 |
| PBS $NH_4$ | $C_4F_9SO_3^-$ + $NH_4$ | May be prepared using method described below, entitled "Preparation of ammonium perfluorobutane-sulfonate." |
| DOWANOL ™ PnP | 1-propoxy-2-propanol; n-$C_3H_7OCH_2CH(OH)CH_3$ | Sigma-Aldrich |

TABLE 1-continued

Table of Materials.

| Material | Structure (and/or chemical name) | Availability |
|---|---|---|
| Emulsifier 029 | Polymeric fluorinated surfactant | As prepared in WO 01/30873A1, Example 5 (which is herein incorporated by reference) |
| Emulsifier 218 | Polymeric fluorinated surfactant | As prepared in WO 01/30873A1, Example 16 (which is herein incorporated by reference) |
| Emulsifier 4171 | $C_4F_9SO_2N(CH_3)(CH_2CH_2O)_{7.5}CH_3$ | As prepared in WO 01/30873A1, Example 1 (which is herein incorporated by reference) |
| FOMBLIN Z-DEAL ™ | $CH_3OC(O)CF_2(CF_2O)_n(CF_2CF_2O)_mCF_2C(O)OCH_3$; where $n_{av}$, $m_{av}$ = ~10–12 | Ausimont, Thorofare, NJ |
| Hydrochloric acid | HCl; 37% wt in water | Sigma-Aldrich |
| HFE 7100 | Perfluorobutylmethyl ether; $C_4F_9OCH_3$; 3M ™ NOVEC ™ HFE-7100 | Minnesota Mining and Manufacturing Co. ("3M"), St. Paul, MN |
| HFPO silane | $C_3F_7O(CF(CF_3)CF_2O)_mCF(CF_3)C(O)NH(CH_2)_3Si(OMe)_3$ | Can be prepared using methods as described in U.S. Pat. No. 3,646,085, Example 4 (which is herein incorporated by reference). |
| IPA | Isopropyl alcohol; $(CH_3)_2CH(OH)$ | Sigma-Aldrich |
| KRYTOX ™ 157 FSL | $C_3F_7O(CF(CF_3)CF_2O)_nCF(CF_3)CO_2H$ (where $n_{avg}$ ~ 13) | E. I. Dupont de Nemours Co, Wilmington, DE |
| Methanol | $CH_3OH$ | Sigma-Aldrich |
| C10 telomer silane | $C_8F_{17}CH_2CH_2Si(OCH_2CH_3)_3$ | ABCR Gmbh & Co., Karlsruhe, Germany |
| F-MPEG amidosilane | $CF_3O(CF_2CF_2O)_7CF_2C(O)NH(CH_2)_3Si(OEt)_3$ | The precursor ester was prepared as described in U.S. Pat. No. 5,488,142 (which is herein incorporated by reference), and subsequently reacted with one equivalent of 3-aminopropyltrimethoxysilane |
| PFPE Disilane | $XCF_2O(CF_2O)_n(C_2F_4O)_mCF_2X$ Where X = $CONH(CH_2)_3Si(OCH_3)_3$ $m_{avg}$, $n_{avg}$ ~ 10–12 | Prepared as described in U.S. Pat. No. 3,810,874 (which is herein incorporated by reference). |
| PFPE Phosphate | Poly(hexafluoropropylene oxide-co-difluoromethylene oxide) alcohol ethoxylated phosphate; $CF_3O(CF(CF_3)CF_2O)_x(CF_2O)_yCF_2CH_2(OCH_2CH_2)_zOPO_3H_2$; Average $M_n$ ca. 450 | Sigma-Aldrich |
| PFPE Phosphate $NH_4$ | $[CF_3O(CF(CF_3)CF_2O)_x(CF_2O)_yCF_2CH_2(OCH_2CH_2)_zOPO_3^{-2}][NH_4^+]_2$ | As prepared in Comparative Examples C3–C9 |

Test Methods

Abrasion/Scrub Test

Durability of the coatings was tested using a PAUL GARDNER™ Model 16VFI linear abrader, available from Paul N. Gardner Co., Pompano Beach, Fla. Each slide, having a layer of cured aqueous dilution on it, was scrubbed using a 3M™ HIGH PERFORMANCE™ wipe (available from Minnesota Mining and Manufacturing, St. Paul, Minn.) covering PAUL GARDNER™ WA-2225 abrasion boat bathed in SOFT SCRUB™, a mildly abrasive multipurpose hard surface cleanser (The Clorox Co., Oakland, Calif.) for 100, 250, and 500 scrubs.

Pen Test

Antisoiling characteristics were demonstrated by application of ink from a black permanent marking pen available under the trade designation SHARPIE™ from Sanford Co., Bellwood, Ill. A "pass" indicated that the ink beaded into small discrete droplets and can be wiped away with a dry tissue available under the trade designation KIMWIPE™ from Kimberly Clark, Roswell, Ga., leaving no trace of residue and no change in the substrate optical properties. A "borderline pass" meant that the marked area exhibits partial or no ink beading and that the ink can be removed, but this typically requires extra force when rubbing the abraded area with a dry KIMWIPE™. A "fail" indicated that the ink wets the substrate and cannot be removed by rubbing the abraded area with a dry KIMWIPE™. Thus failed samples are perfectly receptive to the permanent ink. One "cycle" of the ink test involved inking and wiping (ink/dry wipe cycles).

Contact Angle Measurements

Static contact angles were determined for both water and hexadecane using a KRUSS™ G120/G140 MKI goniometer (Kruss USA, Charlotte, N.C.). The contact angles were measured before (initial) and directly after abrasion (abrasion), unless otherwise indicated. The values are the mean values of 4 measurements and are reported in degrees. The minimum measurable value for a contact angle was 20. A value <20 meant that the liquid spread on the surface. Advancing and receding contact angles were measured using a VCA-2500XE video contact angle analyzer (AST Products, Billerica, Mass.). Larger values of contact angles indicate better repellency.

Coating Methods

Coatings were applied to using either a flow coat, a dipcoat, spray coat or spin coat method.

Flow Coat Method

A few milliliters of each aqueous dilution to be tested were flowed over the surface of a precleaned microscope glass slide using a plastic pipette. The glass slides were then heat cured in a 120° C. oven for 30 minutes.

Dipcoat Method

Using a locally constructed dip coat machine, microscope slides were dip coated using various aqueous mixtures to be tested. Each slide was dipped into the solution where it was maintained for a period of 5 seconds. The slides were then withdrawn from the solution at a rate of approximately 10 cm/min. The coated slides were cured at either 120° C. for 30 minutes or at room temperature for 16 hrs prior to testing.

Spray Coat Method

In a first step, the substrates were cleaned and degreased with acetone. After cleaning, aqueous dilutions described in the respective examples were applied to the substrates, by spray application at about 20 ml/minute. The substrates were kept at room temperature before coating. Alternatively, the substrates were preheated before coating. Coated samples were dried at room temperature or forced-air oven dried at 120° C. for 30 minutes. Afterwards, excess product was polished off using a dry paper cloth.

Spin Coat Method

Spin coating was done using a CEE™ Model 100 spinner (300 rpm/5 sec, then 2000 rpm/15 sec) available from Brewer Science, Rolla, Mo.

Preparation of Ammonium Perfluorobutanesulfonate (PBS-NH$_4$)

To a 3L 3-neck round bottom flask, 206 g (3.16 moles) of aqueous ammonium hydroxide (23% by weight NH$_3$) was slowly added to 767 g (2.56 moles) of perfluorobutanesulfonic acid. The NH$_4$OH was added slowly so as to maintain the temperature of the solution below 60° C. During the addition of the NH$_4$OH the mixture was vigorously stirred and the pH monitored. The reaction was determined to be complete with no further addition of NH$_4$OH when the mixture reached a pH of 10. Water was partially removed from the product, PBS-NH$_4$, by evaporation affording a white clumpy solid. The product was further dried in a 120° C. oven overnight yielding 812 g (>99% yield) of a white powdery solid.

Perfluorobutanesulfonic acid can be prepared using the methods described in, Conte, L.; Napoli, M.; Scipioni, A. *J. Fluorine Chem.* 1991, 53, 277–283 (which is incorporated herein by reference).

Preparation 1. 10 wt % Ammonium Salt of KRYTOX™ 157FSL in Methanol

To a 30 mL glass, screwcap vial containing methanol (9.0 g) was added KRYTOX™ 157FSL (1.0 g) and one drop of concentrated aqueous ammonium hydroxide solution. The mixture was hand shaken for several seconds, resulting in a clear, foamy solution.

Comparative Concentrate C1

To a 30 mL glass screwcap vial was added methanol (4.5 g) and PFPE disilane (2.0 g). Shaking the vial by hand, and allowing the vial to stand for several minutes resulted in two distinct, clear, liquid phases.

Concentrate 1, 16.7% PFPE Disilane

To a 30 mL glass screwcap vial was added 10 wt % KRYTOX™ 157FSL ammonium salt solution in methanol (5.0 g; from Preparation 1) and PFPE disilane (1.0 g). Shaking the vial by hand resulted in a clear, single-phase liquid containing 16.7 wt % PFPE disilane.

Concentrate 2, 28.6% PFPE Disilane

To a 30 mL glass screwcap vial was added 10 wt % KRYTOX™ 157FSL ammonium salt solution (5.0 g; from Preparation 1) and PFPE disilane (2.0 g). Shaking the vial by hand resulted in a clear, single-phase liquid containing 28.6 wt % PFPE disilane.

Aqueous Dilutions

Examples 1 and 2

Aqueous dilutions of Concentrate 1 (Example 1) and Concentrate 2 (Example 2) were prepared by mixing the appropriate concentrate (0.5 g) with deionized water (10.0 g) and shaking. Both dilutions yielded clear solutions that showed slight foaming upon agitation. After standing overnight at room temperature, the solutions were still clear with no evidence of phase separation or formation of precipitate.

Just after preparation, a few drops of the aqueous dilutions were pipetted onto ordinary glass microscope slides, the liquids were spread with a pipette tip, and the slides allowed to stand at room temperature overnight. Upon return, the slides were seen to be coated with films in the areas originally occupied by the solutions. Flushing under cold running tap water did not remove the coatings, and vigorous buffing with KIMWIPE™ tissues was required to remove the bulk material and expose clean glass. Using the Pen Test, ink from a black SHARPE™ permanent pen marker applied to these areas showed excellent ink beading and dry wipe ink removal. In addition, the test could be repeated multiple times with the samples continuing to show good ink beading and removability. In contrast, ink applied to an untreated slide showed no beading and could not be removed by dry wiping; its complete removal required washing with a solvent such as isopropyl alcohol (IPA) or acetone.

An aqueous dilution was prepared from Concentrate 1 (0.1 g) and deionized water (10.0 g). This clear solution was spin coated on a glass microscope slide, then placed in a forced-air oven at 120° C. for 35 min. This coating method yielded a coating with extremely uniform appearance. After cooling, the coated slide was tested using the Pen Test described above, and found to give excellent ink beading and easy dry wipe ink removability. The sample was then subjected to measurement of water contact angles, with the following results: static, 95 (range 93–100); advancing, 101 (range 93–108); receding, 73 (range 66–86) degrees. Values reported are the averages of measurements on both sides of at least three drops.

Concentrate 3 (3:1:4 PFPE Disilane:DBI NH$_4$:IPA)

An 8-mL screwcap vial was charged with DBI NH$_4$ (1.0 g), and IPA (4.0 g). The solution was shaken until the salt was mostly dissolved affording a colorless slightly hazy solution. To this mixture was added PFPE disilane (3.0 g). Hand shaking resulted in a nearly clear yellow solution.

Concentrate 4 (3:2:3 PFPE Disilane:Emulsifier 218:IPA)

An 8-mL screwcap vial was charged with PFPE disilane (3.0 g), Emulsifier 218 (2.0 g), and IPA (3.0 g). The solution was hand shaken affording a homogeneous, clear, yellow solution.

Concentrate 5 (3:3:2 PFPE Disilane:Emulsifier 029:IPA)

An 8-mL screwcap vial was charged with PFPE disilane (3.0 g), Emulsifier 029 (3.0 g), and IPA (2.0 g). The solution was hand shaken affording a homogeneous, clear, slightly red solution.

Concentrate 6 (3:1:4 F-MPEG Amidosilane:DBI $NH_4$:IPA)

An 8-mL screwcap vial was charged with DBI $NH_4$ (1.0 g) and IPA (4.0 g). The solution was hand shaken until the salt was mostly dissolved, affording a colorless slightly hazy solution. To this mixture, F-MPEG amidosilane (3.0 g) was added and mixed to give a nearly clear yellow solution.

Concentrate 7 (3:1:4 HFPO Silane:DBI NH4:IPA)

An 8-mL screwcap vial was charge with DBI $NH_4$ (1.0 g), and IPA (4.0 g). The solution was shaken until the DBI $NH_4$ was mostly dissolved, affording a colorless slightly hazy solution. To this mixture HFPO silane (3.0 g) was added and hand shaken to yield a slightly hazy colorless solution.

Concentrate 8 (3:1:4 PFPE Disilane: Ammonium Salt of KRYTOX™ 157FSL:IPA)

KRYTOX™ 157FSL carboxylic acid was converted to the corresponding ammonium salt by bubbling ammonia gas through the liquid until the exotherm subsided, then removal of excess ammonia under aspirator vacuum. This left a clear, colorless, extremely viscous liquid. An 8-mL screwcap vial was charged with PFPE disilane (3.0 g), the above ammonium carboxylate salt (1.0 g), and IPA (4.0 g). Shaking the vial by hand yielded a clear, colorless liquid concentrate.

Concentrate 9 (3:1:4 C10 Telomer Silane:DBI NH4:IPA)

An 8-mL screwcap vial was charged with DBI $NH_4$ (1.0 g) and IPA (4.0 g). The solution was shaken until the DBI NH4 was mostly dissolved, affording a colorless slightly hazy solution. To this mixture was added C10 telomer silane (3.0 g). The ensuing mixture was shaken to yield a slightly hazy colorless solution.

Concentrate 10 (3:1:4 PFPE Disilane:Emulsifier 4171:IPA)

A dilutable, non-aqueous concentrate was prepared by mixing of PFPE disilane (3.0 g), Emulsifier 4171 (1.0 g), and IPA (4.0 g) in an 8 mL screwcap vial affording a clear colorless solution.

Concentrate 11 (3:1 PFPE Disilane:Emulsifier 4171)

A dilutable, non-aqueous concentrate was prepared by mixing PFPE disilane (3.0 g) and Emulsifier 4171 (1.0 g) in a 8 mL screwcap vial affording a homogeneous clear colorless solution.

Examples 3–16

Several aqueous dilutions were prepared using Concentrates 3–11 and the method outlined above. The general procedure used for preparing these dispersions was the addition of a small amount of concentrate to a glass jar and then dilution with either water, 1% aqueous $NH_4OH$, or 5% aqueous HCl. Appearance of the aqueous dilutions were noted. Pre-cleaned glass slides were flow coated, then evaluated using the Pen Test described above. Results are noted in Table 2.

TABLE 2

| Example | Concentrate | Dilution | Appearance | Pen Test |
|---|---|---|---|---|
| 3 | 3 | 0.1 g in 10 g $H_2O$ | Clear, colorless | pass |
| 4 | 3 | 0.03 g in 10 g $H_2O$ | Clear, colorless | pass |
| 5 | 3 | 0.01 g in 10.0 g $H_2O$ | Clear, colorless | pass |
| 6 | 3 | 0.1 g in 10 g 1% $NH_4OH$ | Clear, colorless | pass |
| 7 | 3 | 0.1 g in 10 g 5% HCl | precipitate | pass |
| 8 | 4 | 0.1 g 10 g $H_2O$ | Slight haze, colorless | pass |
| 9 | 4 | 0.1 g in 10 g 1% $NH_4OH$ | Clear, colorless | pass |
| 10 | 5 | 0.1 g in 10.0 g $H_2O$ | Slight haze, colorless | pass |
| 11 | 6 | 0.03 g in 10.0 g $H_2O$ | Clear, colorless | pass |
| 12 | 7 | 0.03 g in 10.0 g $H_2O$ | Clear, colorless | pass |
| 13 | 8 | 0.03 g in 10.0 g $H_2O$ | Clear, colorless | pass |
| 14 | 9 | 0.03 g in 10.0 g $H_2O$ | Clear, colorless | pass |
| 15 | 10 | 0.03 g in 10.0 g $H_2O$ | Clear, colorless | pass |
| 16 | 11 | 0.05 g in 25.0 g $H_2O$ | Clear, colorless | pass |

Comparative Examples C1 and C2 and Examples 17–26

Pre-cleaned glass slides were dip coated in the dilutions shown in Table 3 and the coatings cured under the conditions indicated. Static water and hexadecane contact angles were determined following each series. Comparative Examples C1 and C2 are diluted with solvents and Examples 17–26 are diluted with water. Results are summarized in Table 3.

TABLE 3

| Ex. | Concentrate | Dilution | % FC silane | Additive | Cure | Contact Angle (°) Initial water/hexadecane | Contact Angle (°) 100 scrubs water/hexadecane | Contact Angle (°) 250 scrubs water/hexadecane | Contact Angle (°) 500 scrubs water/hexadecane |
|---|---|---|---|---|---|---|---|---|---|
| C1 | C1 | PFPE disilane in HFE 7100 | 0.1 | 1.5% AcOH | * | 109/66 | 108/66 | 108/66 | 107/66 |
| C2 | C1 | PFPE disilane in 95/5 EtOH/$H_2O$ | 0.1 | 1.5% AcOH | * | 109/68 | 110/68 | 111/67 | 109/65 |

TABLE 3-continued

| Ex. | Concentrate | Dilution | % FC silane | Additive | Cure | Contact Angle (°) Initial water/hexadecane | Contact Angle (°) 100 scrubs water/hexadecane | Contact Angle (°) 250 scrubs water/hexadecane | Contact Angle (°) 500 scrubs water/hexadecane |
|---|---|---|---|---|---|---|---|---|---|
| 17 | 3 | 0.3 g in 100 g H$_2$O | 0.11 | N/A[#] | * | 105/63 | 106/64 | 106/65 | 104/62 |
| 18 | 3 | 0.3 g in 100 g H$_2$O | 0.11 | N/A | ** | 106/67 | 107/64 | 106/64 | 105/64 |
| 19 | 4 | 0.3 g in 100 g H$_2$O | 0.11 | N/A | * | 97/61 | 99/57 | 96/56 | 87/51 |
| 20 | 4 | 0.3 g in 100 g aq 1% NH$_4$OH | 0.11 | N/A | * | 96/60 | 103/61 | 101/58 | 96/55 |
| 21 | 4 | 0.3 g in 100 g H$_2$O | 0.11 | N/A | ** | 81/62 | 65/36 | N/A | N/A |
| 22 | 4 | 0.3 g in 100 g aq 1% NH$_4$OH | 0.11 | N/A | ** | 93/64 | 75/43 | N/A | N/A |
| 23 | 6 | 0.3 g in 100 g H$_2$O | 0.11 | N/A | * | 111/74 | N/A | N/A | N/A |
| 24 | 7 | 0.3 g in 100 g H$_2$O | 0.11 | N/A | * | 97/69 | N/A | N/A | N/A |
| 25 | 8 | 0.3 g in 100 g H$_2$O | 0.11 | N/A | * | 105/64 | 105/60 | 104/60 | 103/58 |
| 26 | 10 | 0.3 g in 100 g H$_2$O | 0.11 | N/A | * | 104/64 | 108/66 | 109/68 | 108/67 |

*30 minutes @ 120° C.
**16 hours @ room temperature
[#]N/A = does not apply

Comparative Examples C3–C9

Preparation of PFPE phosphate NH$_4$

A mixture of 1 part PFPE phosphate and 4 parts of IPA was charged to a screwcap vial and shaken to dissolve the PFPE phosphate. Excess ammonia was then bubbled through the solution, resulting in a slight haziness and viscosity increase.

Comparative Examples listed in Table 4 were prepared in the ratios listed by adding to a screwcap vial either PFPE phosphate or PFPE phosphate NH$_4$, IPA, shaking to dissolve, and finally adding PFPE disilane. For those samples utilizing PFPE phosphate NH$_4$ and methanol as the cosolvent, the IPA was removed under aspirator vacuum after treatment with ammonia, then methanol and PFPE disilane were added. The initial appearance of all concentrates immediately after preparation is noted in the 6$^{th}$ column from the left in Table 4. The samples were observed again at a later time and the appearance noted, as indicated in the 7$^{th}$ column from the left. Finally, during their clear stages several of the concentrates were diluted into water by adding 10 g deionized tap water to 0.1 g concentrate in a screwcap vial and shaking the mixture by hand. The appearance of the aqueous dilutions is noted in the last column (8$^{th}$ column from the left).

Examples 27–29

Application of Concentrate 4 on Glazed Ceramic Tile

An aqueous dilution was prepared by mixing Concentrate 4 (0.3 g) with deionized water (100 g) affording a clear colorless solution. A 4"×4" white precleaned, glazed ceramic tile (Bright snowwhite, available from US Ceramic Tile Co., East Sparta, Ohio) was spray coated. Coatings were cured for 30 min. at 120° C. in a forced air oven. Performance of the coating was determined through the measurement of initial static contact angles and static contact angles following various cycles of abrasion. Results are summarized in table 5 below (Example 27).

Concentrate 12 (PBS-NH$_4$ as Additive)

A dilutable concentrate was prepared by mixing in an 8 mL screwcap vial PFPE disilane (3.0 g), Emulsifier 218 (2.0 g), IPA (3.0 g), and PBS-NH$_4$ (0.5 g) affording a clear colorless solution. An aqueous dilution was prepared by mixing the concentrate (0.3 g) with deionized water (100 g) affording a clear colorless solution. The solution was spray coated onto a precleaned glazed ceramic tile (Bright snowwhite, available from US Ceramic Tile Co.). Coatings were cured for 30 min. at 120° C. in a forced air oven. Initial

TABLE 4

| Example | Parts of PFPE disilane | Parts of PFPE phosphate | Parts of PFPE phosphate NH$_4$ | Parts of co-solvent (type) | Initial Appearance | Appearance after time indicated | Dilution* |
|---|---|---|---|---|---|---|---|
| C3 | 3 | 0.5 | — | 4 (IPA) | Clear | Cloudy (5 min) | Precipitated solid |
| C4 | 3 | 1.0 | — | 4 (IPA) | Clear | Cloudy (5 min) | Precipitated solid |
| C5 | 3 | 0.5 | — | 4 (methanol) | Clear | Cloudy (24 hr) | Precipitated solid |
| C6 | 3 | 1.0 | — | 4 (methanol) | Clear | Cloudy (24 hr) | Precipitated solid |
| C7 | 3 | — | 1.0 | 4 (IPA) | Cloudy | N/A** | N/A |
| C8 | 3 | — | 1.0 | 4 (methanol) | Cloudy | N/A | N/A |
| C9 | 3 | — | 0.5 | 4 (methanol) | Cloudy w/ gelled particles | N/A | N/A |

*Results of dilution of 0.1 g clear liquid (if achieved) with 10 g of deionized water
**Does not Apply and durable performance test results are shown in table 5 below (Example 28).

Concentrate 13 (DBI NH$_4$ as Additive)

A dilutable concentrate was prepared by mixing in an 8 mL screwcap vial PFPE disilane (3.0 g), Emulsifier 218 (2.0 g), IPA (3.0 g), and DBI-NH$_4$ (0.5 g) affording a slightly hazy colorless solution. An aqueous dilution was prepared by mixing 0.3 g of the concentrate with 100 g of deionized water affording a clear colorless solution. The solution was spray coated onto a precleaned glazed ceramic tile (Bright snowwhite, available from US Ceramic Tile Co.) as described above. Coatings were cured for 30 min. at 120° C. in a forced air oven. Initial and durable performance test results are shown in table 5 below (Example 29).

Example 36

Water Dynamic Contact Angle Measurements on Dip Coated Glass Slides

A concentrate was prepared by mixing in a screwcap vial 3 parts PFPE disilane, 1 part DBI NH$_4$, and 4 parts DOWANOL™ PnP. The initially hazy liquid was allowed to stand overnight at room temperature, yielding a virtually clear liquid with a small amount of white precipitated solid on the bottom of the vial. The clear liquid (0.4 g) was diluted to 100 g with deionized tap water and shaken to give a clear solution which foamed on shaking. A standard glass microscope slide was cleaned by 5 min exposure in a UV/ozone chamber, then dip coated in the aqueous dilution. The coated slide was heated in a forced-air oven at 120° C. for 30 min. After cooling, water static, advancing, and receding contact

TABLE 5

| | | | | Contact Angles (°) | | | | |
|---|---|---|---|---|---|---|---|---|
| | | | | Static | | Durability (static water/hexadecane) | | |
| Ex. | Concentrate | Additive | Substrate | Water | Hexadecane | 100 scrubs | 250 scrubs | 500 scrubs |
| 27 | 4 | none | ceramic tile | 101 | 63 | 57/36 | too low | too low |
| 28 | 12 | PBS-NH$_4$ | ceramic tile | 108 | 68 | 102/56 | 101/59 | 103/55 |
| 29 | 13 | DBI-NH$_4$ | ceramic tile | 110 | 67 | 102/63 | 107/63 | 103/57 |

Examples 30–35

Stability of Aqueous Dilutions

Several aqueous dilutions were prepared from concentrates 3–6, 8, and 10 by mixing the respective concentrate (0.3 g) and deionized water (100 g) in an 8-ounce glass jar affording clear colorless solutions in each case. Within several minutes of preparation of each of the aqueous dilutions, precleaned glass microscope slides were dip coated with each solution. Coatings were cured for 30 min. at 120° C. in a forced air over. Static contact angles were determined for each slide. The aqueous dilutions were allowed to age for various periods of time, after which time glass microscope slides were dip coated into the aged dilutions. Performance of the coatings derived from the aged aqueous dilutions was determined by measurement of static contact angles. Results are summarized in table 6 below (Examples 30–35).

angles were measured on the slide. Two drops measured on both sides were used in each of the measurements, and the results were averaged. Contact angles are listed in Table 7.

Examples 37–38 and Comparative Example C10: Aqueous Delivery of PFPE Disilane Films on AR Glass Coating solutions were prepared by diluting 0.1 g and 0.5 g samples of Concentrate 8 to 100 g with a 3:1 (w/w) mixture of deionized tap water and DOWANOL™ PnP. This gave clear dilutions (0.038 and 0.19 wt % PFPE disilane, respectively) which foamed upon shaking. A comparative solution was also prepared by diluting PFPE disilane to 0.1 wt % in HFE 7100.

Three pieces of TDAR/none antireflective glass (cut from a sheet of the material) each of approximate dimensions 5 cm.×10 cm. (obtained from Viratec Thin Films, Faribault, Minn.) were cleaned by sonication for several minutes in a bath of 1:1 (w/w) IPA:chloroform (available from Sigma-Aldrich), then 5 min exposure in a UV/ozone chamber.

TABLE 6

| | | | Static Contact Angles (°) (water/hexadecane) | | | | | | | | |
|---|---|---|---|---|---|---|---|---|---|---|---|
| Ex. | Conc. | Dilution | Initial | 1 hr | 2 hrs | 4 hrs | 6 hrs | 16 hrs | 24 hrs | 40 hrs | 72 hrs |
| 30 | 3 | 0.3 g/100 g H2O | 109/66 | 101/60 | 97/62 | 92/52 | 69/38 | | | | |
| 31 | 4 | 0.3 g/100 g H2O | 101/63 | 104/59 | 102/61 | 103/63 | 98/58 | 96/59 | 91/58 | 89/53 | 76/43 |
| 32 | 5 | 0.3 g/100 g H2O | 103/65 | | | | | 100/63 | | | |
| 33 | 6 | 0.3 g/100 g H2O | 111/74 | 110/74 | 92/59 | | | | | | |
| 34 | 8 | 0.3 g/100 g H2O | 102/63 | 107/63 | 108/65 | 106/62 | 105/62 | | | | |
| 35 | 10 | 0.3 g/100 g H2O | 106/64 | 107/67 | 108/65 | 105/67 | 104/60 | 73/40 | 68/45 | 48/28 | |

Example 37 was coated with the 0.1 wt % aqueous dilution using an automated dip coating apparatus and a withdrawal speed of 1.4 mm/sec, while Example 38 was coated with the 0.5 wt % aqueous dilution by the spin coating method. Comparative Example C10 was prepared by dip coating in the comparative solution (in HFE-7100) given above using a withdrawal speed of 3.4 mm/sec. All of the coated samples were heated in a forced-air oven at 120° C. for 30 min. and allowed to cool. All three samples showed excellent optical uniformity, except for a ring of small droplets near the edge of the aqueous dip coated sample. Water static, advancing, and receding contact angles were measured on these samples as described above. Results reported are averages of measurements of at least three drops, and are shown in Table 7.

TABLE 7

| Example | Coating Method | Static Water Contact Angle (°) | Dynamic Water Contact Angle (°) Adv/Rec |
|---|---|---|---|
| 36 | Dip | 108 | 118/103 |
| 37 | Dip | 105 | 114/82 |
| 38 | Spin | 103 | 112/80 |
| C10 | Dip | 105 | 114/86 |

What is claimed is:

1. A composition comprising a dilutable, non-aqueous, homogeneous mixture comprising:

(a) at least one fluorinated silane of the formula I:

$$R_f^1 - [-Q - [SiY_{3-x}R^1_x]_z]_y \quad (I)$$

wherein $R_f^1$ represents a monofunctional or difunctional perfluoropolyether group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and (b) at least one fluorinated surfactant.

2. The composition of claim 1 wherein $R_f^1$ represents a monofunctional perfluoropolyether comprising: terminal groups selected from the group consisting of $(C_nF_{2n+1})$—, $(C_nF_{2n+1}O)$— or $X'C_nF_{2n}O)$—, wherein X' is H, Cl, or Br, and wherein n is 1 to 6; and, perfluorinated repeating units selected from the group consisting of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, and combinations thereof, wherein Z is a fluorine atom, a perfluoroalkyl group, an oxygen-substituted perfluoroalkyl group, a perfluoroalkoxy group or an oxygen-substituted perfluoroalkoxy group, and wherein n is 1 to 6.

3. The composition of claim 1 wherein $R_f^1$ represents a difunctional perfluoropolyether comprising perfluorinated repeating units selected from the group consisting of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, and combinations thereof, wherein Z is a fluorine atom, a perfluoroalkyl group, an oxygen-substituted perfluoroalkyl group, a perfluoroalkoxy group or an oxygen-substituted perfluoroalkoxy group, and wherein n is 1 to 6.

4. The composition of claim 1 wherein $R_f^1$ represents a monofunctional perfluoropolyether selected from the group consisting of $C_3F_7O(CF(CF_3)CF_2O)_pCF(CF_3)$— and $CF_3O(C_2F_4O)_pCF_2$— wherein an average value for p is 4 to 50.

5. The composition of claim 1 wherein $R_f^1$ represents a difunctional perfluoropolyether selected from the group consisting of: —$CF_2O(CF_2O)_m(C_2F_4O)_pCF_2$— and —$CF(CF_3)(OCF_2CF(CF_3))_mO(C_nF_{2n})O(CF(CF_3)CF_2O)_pCF(CF_3)$—, wherein the average value for n is from 2 to 4; —$CF_2O(C_2F_4O)_pCF_2$— and —$(CF_2)_3O(C_4F_8O)_p(CF_2)_3$—, wherein average values for m and p are 0 to 50, with the proviso that m and p are not simultaneously zero.

6. The composition of claim 1 wherein $R_f^1$ is —$CF(CF_3)(OCF_2CF(CF_3))_m(C_nF_{2n})O(CF(CF_3)CF_2O)_pCF(CF_3)$—, wherein number averages m and p are from 1 to 20, m+p≦20, and n is from 2 to 4.

7. The composition of claim 1 wherein $R_f^1$ is —$CF_2O(CF_2O)_m(CF_2CF_2O)_pCF_2$—, and wherein the average value of m+p is from 16 to 24.

8. The composition of claim 1 wherein $R_f^1$ is $C_3F_7O(CF(CF_3)CF_2O)_pCF(CF_3)$—, and wherein the average value of p is from 4 to 15.

9. The composition of claim 1 wherein $R_f^1$ is $CF_3O(CF_2CF_2O)_pCF_2$—, and wherein the average value of p=6 to 20.

10. The composition of claim 1 wherein $R_f^1$ is $CF_3CF_2CF_2O(CF_2CF_2CF_2O)_n$—, wherein $n_{avg}$=1 to 20.

11. The composition of claim 1 wherein Y is independently selected from the group consisting of methoxy groups, ethoxy groups, $C_3$–$C_6$ alkoxy groups optionally containing one ether oxygen, and mixtures thereof.

12. The composition of claim 1 wherein said at least one fluorinated silane comprises:

$(MeO)_3SiCH_2CH_2CH_2NHCO$—$CF_2O(CF_2O)_m(C_2F_4O)_nCF_2$—$CONHCH_2CH_2CH_2Si(OMe)_3$, wherein average values for m and n are about 10 to about 12.

13. The composition of claim 1 wherein said at least one fluorinated silane comprises:

$C_3F_7O(CF(CF_3)CF_2O)_pCF(CF_3)CONHCH_2CH_2CH_2Si(OMe)_3$, and wherein the average value of p is from 4 to 15.

14. The composition of claim 1 wherein said at least one fluorinated silane comprises:

$(MeO)_3Si(CH_2)_3NHCOCF(CF_3)(OCF_2CF(CF_3))_mO(C_nF_{2n})O(CF(CF_3)CF_2O)_pCF(CF_3)CONH(CH_2)_3Si(OMe)_3$, wherein average values of m and p are from 1 to 20, m+p≦20, and n is from 2 to 4.

15. The composition of claim 1 wherein said at least one fluorinated surfactant comprises:

$C_4F_9SO_2N(CH_3)(C_2H_4O)_nCH_3$, and wherein $n_{avg}$ is about 7.

16. The composition of claim 1 wherein said at least one fluorinated surfactant comprises:

$C_3F_7O(CF(CF_3)CF_2O)_nCF(CF_3)CO_2^-NH_4^+$, wherein $n_{avg}$ is about 13.

17. The composition of claim 1 wherein said at least one fluorinated surfactant is a polymeric fluorinated surfactant.

18. The composition of claim 1 wherein said at least one fluorinated surfactant is a random copolymer fluorinated surfactant.

19. The composition of claim 18 wherein said random copolymer fluorinated surfactant comprises:

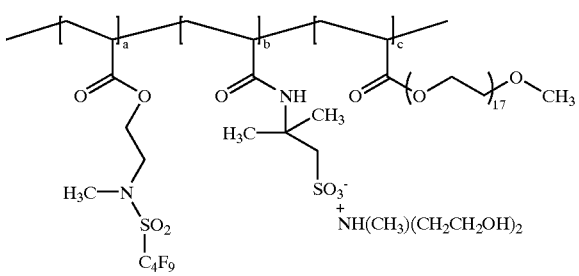

wherein the molar ratio of a:b:c is about 30: about 1: about 32, and wherein the random copolymer fluorinated surfactant has a molecular weight of about 1,000 to about 4,000 grams per mole.

20. The composition of claim 18 wherein said random copolymer fluorinated surfactant comprises:

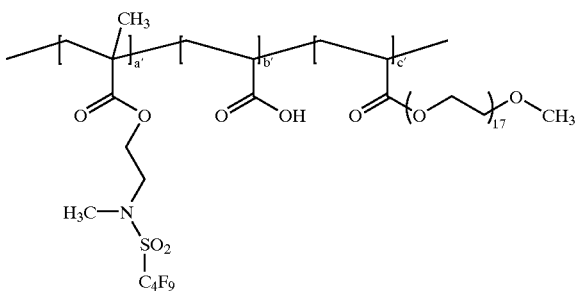

wherein the molar ratio of a':b':c' is about 3: about 3: about 1, and wherein the random copolymer fluorinated surfactant has a molecular weight of about 5,000 to about 40,000 grams per mole.

21. The composition of claim 1 and further comprising one or both of at least one organic cosolvent and at least one additive.

22. An aqueous dilution comprising:
a. a diluting medium comprising water or an aqueous solvent mixture comprising water and at least one water miscible cosolvent; and
b. a dilutable, non-aqueous concentrate comprising a non-aqueous, homogeneous mixture comprising:
i. at least one fluorinated silane of the formula I:

wherein $R_f^1$ represents a monofunctional or difunctional perfluoropolyether group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and
ii. at least one fluorinated surfactant.

23. The aqueous dilution of claim 22 wherein said dilutable, non-aqueous concentrate further comprises one or both of at least one organic cosolvent and at least one additive.

24. A method for treating a substrate comprising the steps of applying an aqueous dilution according to claim 22 to said substrate, and curing said aqueous dilution.

25. An article comprising:
a. a substrate; and,
b. a coating on said substrate obtained by applying the aqueous dilution according to claim 22 onto said substrate and curing said aqueous dilution.

26. The article of claim 25 wherein the substrate comprises glass.

27. The article of claim 25 wherein the substrate comprises ceramic.

28. The article of claim 25 wherein the substrate comprises an antireflective film.

29. A composition comprising a dilutable non-aqueous, homogeneous mixture comprising:
(a) at least one fluorinated silane of the formula I:

wherein $R_f^1$ represents a monofunctional or difunctional fluorinated group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and
(b) at least one polymeric fluorinated surfactant wherein said surfactant is a random copolymer fluorinated surfactant.

30. The composition of claim 29, wherein said random copolymer fluorinated surfactant comprises:

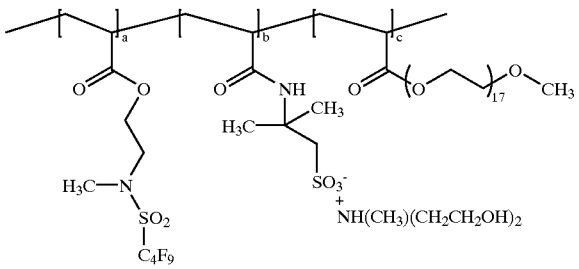

wherein the molar ratio of a:b:c is about 30: about 1: about 32, and wherein the random copolymer fluorinated surfactant has a molecular weight of about 1,000 to about 4,000 grams per mole.

31. The composition of claim 29, wherein said random copolymer fluorinated surfactant comprises:

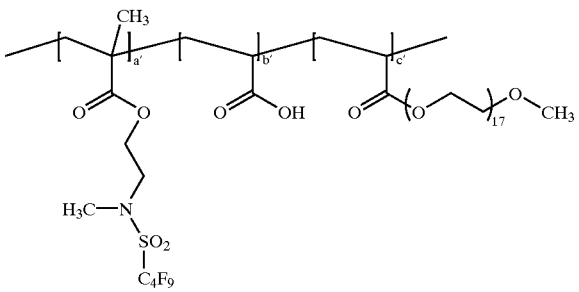

wherein the molar ratio of a':b':c' is about 3: about 3: about 1, and wherein the random copolymer fluorinated surfactant has a molecular weight of about 5,000 to about 40,000 grams per mole.

32. An aqueous dilution comprising:
a. a diluting medium comprising water or an aqueous solvent mixture comprising water and at least one water miscible cosolvent; and
b. a dilutable, non-aqueous concentrate comprising a non-aqueous, homogeneous mixture comprising:
i. at least one fluorinated silane of the formula I:

wherein $R_f^1$ represents a monofunctional or difunctional fluorinated group; Q independently represents an organic difunctional or trifunctional linking group; $R^1$ independently represents a $C_1$–$C_4$ alkyl group; Y independently represents a hydrolyzable group; x is 0 or 1; y is 1 or 2; and z is 1 or 2; and ii. at least one polymeric fluorinated surfactant wherein said surfactant is a random copolymer fluorinated surfactant.

* * * * *

UNITED STATES PATENT AND TRADEMARK OFFICE
CERTIFICATE OF CORRECTION

PATENT NO.    : 6,592,659 B1
DATED         : July 15, 2003
INVENTOR(S)   : Terrazas, Michael S.

Page 1 of 1

It is certified that error appears in the above-identified patent and that said Letters Patent is hereby corrected as shown below:

Column 1,
Line 35, delete "coatings" and insert in place -- thereof --

Column 5,
Line 51, delete "Si(OCH$_3$)$_3$)$_3$;" and insert in place thereof -- Si(OCH$_3$)$_3$; --

Column 17,
Line 19, delete "charge" and insert in place thereof -- charged --

Signed and Sealed this

Thirteenth Day of April, 2004

JON W. DUDAS
*Acting Director of the United States Patent and Trademark Office*